United States Patent
Hagihara

(10) Patent No.: US 7,626,351 B2
(45) Date of Patent: Dec. 1, 2009

(54) MOTION CONTROLLER AND SYSTEM IDENTIFYING METHOD

(75) Inventor: Jun Hagihara, Fukuoaka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 357 days.

(21) Appl. No.: 11/797,945

(22) Filed: May 9, 2007

(65) Prior Publication Data
US 2007/0216333 A1    Sep. 20, 2007

Related U.S. Application Data

(63) Continuation-in-part of application No. PCT/JP2005/017592, filed on Sep. 26, 2005.

(30) Foreign Application Priority Data

Nov. 12, 2004   (JP) .............................. 2004-328574
Jan. 27, 2005   (JP) .............................. 2005-019283

(51) Int. Cl.
  *G05B 19/416*   (2006.01)
(52) U.S. Cl. ........................ 318/617; 318/623; 318/461; 318/565
(58) Field of Classification Search ................. 318/563, 318/565, 568.24, 609, 610, 615–623, 632, 318/648, 456, 461
See application file for complete search history.

(56) References Cited

U.S. PATENT DOCUMENTS

| 5,521,481 A * | 5/1996 | Yamada ...................... 318/632 |
| 5,598,077 A * | 1/1997 | Matsubara et al. ..... 318/568.22 |
| 5,691,615 A * | 11/1997 | Kato et al. ................... 318/609 |
| 6,066,074 A * | 5/2000 | Marcinkiewicz ............... 482/4 |
| 6,316,893 B1 * | 11/2001 | Rasimus ..................... 318/432 |

\* cited by examiner

*Primary Examiner*—Bentsu Ro
(74) *Attorney, Agent, or Firm*—Westerman, Hattori, Daniels & Adrian, LLP

(57) ABSTRACT

A motion controller accurately identifies system constants, such as inertia, viscous friction coefficient, and constant disturbance, without requiring operation, even in cases where viscous friction and/or constant disturbance are present. An identifier includes a time-differentiator for calculating an acceleration detection value afb by time-differentiating a speed detection value Vfb, a first filter for calculating Fafb by filtering the acceleration detection value afb, a second filter for calculating Fvfb by filtering the speed detection value Vfb, a third filter for calculating Ftref by filtering a torque command value Tref, and a JDC estimator for calculating an inertia identification value J_hat, a viscous friction coefficient identification value D_hat, and a constant disturbance identification value C_hat of a control object by performing time-differentiation and four arithmetic operations based on Ftref, Fvfb and Fafb.

15 Claims, 6 Drawing Sheets

MOTION CONTROLLER AND SYSTEM IDENTIFYING METHOD

RELATED APPLICATIONS

This application is a continuation-in-part of International Patent Application No. PCT/JP2005/017592, filed on Sep. 26, 2005. This application claims priority under 35 U.S.C. §119 to Japanese Patent Applications No. 2004-328574 filed on Nov. 12, 2004 and No. 2005-019283 filed on Jan. 27, 2005. Each of the entire disclosures of these applications is incorporated herein by reference in its entirety.

BACKGROUND OF THE INVENTION

1. Field of the Invention

The present invention relates to a motion controller and a system identifying method for accurately estimating inertia, viscous friction coefficient and constant disturbance of an control object (i.e., an object to be controlled).

2. Description of Related Art

In a conventional apparatus for estimating inertia of a motor, estimation of the inertia is performed by integrating a torque command value and a model torque command value within a certain time period and multiplying the ratio thereof by an inertia nominal value, while increasing the precision by eliminating constant disturbance, such as, e.g., viscous friction, Coulomb friction and gravity, using specific operations (see, e.g., WO96/37039).

In FIG. 9, the reference numeral "3" denotes an electric motor, "4" denotes a machine connected to the electric motor 3. A detector 5 is attached to the electric motor 3. The reference numeral "71" denotes a command generator configured to output an operation speed command Vref for the motor. The reference numeral "72" denotes a speed controller which performs proportional-integral control so that the command and the motor speed coincide and outputs a torque command value Tref. The reference numeral "75" denotes a current controller configured to output a current value I so that the motor is operated according to the torque command value Tref. The reference numeral "73" denotes an estimator having a model of the motor. This estimator 73 performs proportional-integral control so that the command and the speed of the model coincide and outputs a torque command Tref' of the model. The reference numeral "74" is an identifier configured to obtain an inertia estimate value by integrating the actual torque command Tref, the torque command Tref' inputted in a model at the estimator 73 at the time zone [a, b] and multiplying the ratio thereof by a nominal value J' of the inertia. In this method, in cases where no disturbance exists, the inertia estimate value coincides with an actual inertial J theoretically.

In cases where, however, constant turbulence, such as, e.g., viscous friction, Coulomb friction and/or gravity exists, constrained conditions for preventing influences of viscous friction and/or Coulomb friction on the integrated value of the torque command value Tref at the time zone [a, b] will be required. Furthermore, in order to eliminate constant disturbance such as gravity, a special innovation will be required.

In WO96/37039, the operations shown in FIG. 10 are used as constrained conditions.

FIG. 10 shows graphs in which the horizontal axis shows a time and the vertical axis shows a speed. Each case satisfies constrained conditions of the following operations.

(Constrained conditions of an operation for eliminating viscous friction and Coulomb friction) The integrated values of the speed Vfb in the zone [a, b] is zero. This is represented by, e.g., reciprocating movements.

(Constrained conditions of an operation for eliminating constant disturbance) Inertia J1 obtained from the zone [a1, b1] when operated by a certain speed command and inertia J2 obtained from the zone [a2, b2] when operated by a reverse command in which the positive and the negative are reversed are obtained, and then the average value of J1 and J2 is obtained.

As explained above, in a conventional control constant identifier, inertia J was identified by making an operation satisfying the above explained operation constrained conditions.

In a conventional inertia estimator, because of the aforementioned two constrained conditions, influence of constant disturbance, such as, e.g., viscous friction, Coulomb friction and gravity, could not be eliminated by a single positioning operation or the like, resulting in failure of inertia estimation.

Furthermore, if inertia is identified by ignoring the constrained conditions, there is a problem that the inertia estimation errors increase.

SUMMARY OF THE INVENTION

The present invention was made in view of the above problems, and aims to provide a motor controller and a system identifying method for: accurately calculating an inertia identification value J_hat, a viscous friction coefficient identification value D_hat, and a constant disturbance identification value C_hat of a control object not by requiring mechanical operations but by performing simple calculations even in cases where there are effects of constant disturbance such as viscous friction, Coulomb friction and/or gravity; decreasing noise effects due to time-differentiation operations which are used in the subsequent calculations by performing filter processing; identifying the inertia by simple calculations, i.e., three divisions and five time-differentiations; identifying friction constants by simple calculations, i.e., a single subtraction and a single multiplication, thus requiring fewer calculations; identifying constant disturbance by simple calculations, i.e., two multiplications and a single subtraction with three variables, thus requiring fewer calculations, and enabling three time-differentiations performed for the inertia identifying calculations because the filter has a denominator larger than a numerator by at least three of more orders.

Furthermore, the present invention aims to provide a motor controller and a system identifying method for: accurately calculating an inertial identification value J_hat and a viscous friction coefficient identification value D_hat of a control object by simple calculations even in cases where there is constant disturbance such as viscous friction, Coulomb friction or gravity; decreasing noise effects due to time-differentiation operations which are used in the subsequent calculations by performing filter processing; and also identifying both the inertia and the friction constants by simple calculations of six time-differentiations, six multiplications, three subtractions, and two divisions.

According to a first aspect of the present invention, a system identifying method for a motion controller comprises:

time-differentiating a speed detection value Vfb to calculate an acceleration detection value afb;

filtering the acceleration detection value afb to calculate a signal Fafb;

filtering the speed detection value Vfb to calculate a signal Fvfb;

filtering a torque command value Tref to calculate a signal Ftref; and performing time-differentiation and four arithmetic operations based on Ftref, Fvfb and Fafb to calculate an inertia identification value J_hat, a viscous friction coefficient identification value D_hat and a constant disturbance identification value C_hat of the control object, wherein the motion controller comprises a command generator, a controller which outputs a current value for driving an electric motor based on a command outputted from the command generator and a detection value obtained from a detector attached to the electric motor, and an identifier which identifies inertia identification value J_hat, viscous friction coefficient identification value D_hat and constant disturbance identification value C_hat of a control object.

According to a second aspect of the present invention, in the system identifying method for a motion controller, the calculation for calculating inertia identification value J_hat comprises:

time-differentiating Ftref, Fvfb and Fafb to calculate Dtref, Dvfb and Dafb, respectively, dividing Dtref by Dvfb to calculate W1;
dividing Dafb by Dvfb to calculate W2;
time-differentiating W1 to calculate DW1;
time-differentiating W2 to calculate DW2; and
dividing DW1 by DW2 to obtain the inertia identification value J_hat.

According to a third aspect of the present invention, in the system identifying method for a motion controller, the calculation for calculating viscous friction coefficient identification value D_hat comprises:

after calculating inertia identification value J_hat, multiplying W2 and inertia identification value J_hat to calculate W3; and subtracting W3 from W1 to obtain viscous friction coefficient identification value D_hat.

According to a fourth aspect of the present invention, in the system identifying method for a motion controller, the calculation for calculating constant disturbance identification value C_hat comprises:

after calculating inertial identification value J_hat and viscous friction coefficient identification value D_hat, multiplying Fvfb and viscous friction coefficient identification value D_hat to calculate TF;

multiplying Fafb and inertia identification value J_hat to calculate TA; and subtracting TF and TA from Ftref to obtain constant disturbance identification value C_hat.

According to a fifth aspect of the present invention, in the system identifying method for a motion controller, a filter to be used in the filter processing has a denominator larger than a numerator by at least three of more orders.

According to a sixth aspect of the present invention, in the system identifying method for a motion controller, calculation for calculating inertial identification value J_hat, viscous friction coefficient identification value D_hat and constant disturbance identification value C_hat of the control object is performed only when variable numbers become a set value or more while monitoring the variable numbers, and wherein when the variable numbers are less than the set values, previous values are held as identification values of J_hat, D_hat, and C_hat.

According to a seventh aspect of the present invention, in the system identifying method for a motion controller, the variable numbers to be monitored are any one or a combination of speed Vfb, the acceleration afb, torque Tref, or Fvfb, Fafb or Ftref, or Dvfb, Dw2.

According to an eighth aspect of the present invention, a motion controller comprises:

a command generator;

a current controller which controls an electric motor based on a command outputted from the command generator and a detection value obtained from a detector attached to the electric motor and outputs a current value for driving the electric motor;

an identifier which identifies an inertia identification value J_hat, a viscous friction coefficient identification value D_hat and a constant disturbance identification value C_hat of a control object;

a time-differentiator which time-differentiates a speed detection value Vfb to calculate an acceleration detection value afb;

a first filter which filters the acceleration detection value afb to calculate Fafb;

a second filter which filters the speed detection value Vfb to calculate Fvfb;

a third filter which filters a torque command value Tref to calculate Ftref; and an estimator which performs time-differentiation and four arithmetic operations based on Ftref, Fvfb and Fafb to calculate the inertia identification value J_hat, the viscous friction coefficient identification value D_hat and the constant disturbance identification value C_hat of the control object.

According to a ninth aspect of the present invention, in the motion controller, the estimator comprises:

an inertia estimator which estimates inertia;

a viscous friction estimator which estimates viscous friction; and a constant disturbance estimator which estimates constant disturbance.

According to tenth aspect of the present invention, in a system identifying method for a motion controller comprises:

time-differentiating a speed detection value Vfb to calculate an acceleration detection value afb;

filtering the acceleration detection value afb to calculate a signal Fafb;

filtering the speed detection value Vfb to calculate a signal Fvfb;

filtering a torque command value Tref to calculate a signal Ftref; and time-differentiating Ftref, Fvfb, Fafb to calculate Dtref, Dvfb, Dafb, respectively, and further time-differentiating Dtref, Dvfb and Dafb to calculate D2tref, D2vfb, D2afb; and calculating an inertia identification value J_hat and a viscous friction coefficient identification value D_hat by the following equations:

$$J\_hat = (D2tref \cdot Dvfb - Dtref \cdot D2vfb)/(Dvfb \cdot D2afb - D2vfb \cdot Dafb) \quad (a)$$

$$D\_hat = (D2afb \cdot Dtref - Dafb \cdot D2tref)/(Dvfb \cdot D2afb - D2vfb \cdot Dafb), \quad (b)$$

wherein the motion controller comprises a command generator which generates a command, a current controller which generates a current value for driving an electric motor based on the command and a detection value obtained from a detector attached to the electric motor, and an identifier which identifies inertia identification value J_hat, viscous friction coefficient identification value D_hat and a constant disturbance identification value C_hat of a control object.

According to an eleventh aspect of the present invention, in the system identifying method for a motion controller, a filter to be used in the filter processing has a denominator larger than a numerator by at least three of more orders.

According to a twelfth aspect of the present invention, in the system identifying method for a motion controller, a filter to be used in the filter processing comprises a plurality of moving average filters connected in series.

According to a thirteenth aspect of the present invention, in the system identifying method for a motion controller, calculation for calculating the inertial identification value J_hat, the viscous friction coefficient identification value D_hat and the constant disturbance identification value C_hat of the control object is performed only when variable numbers of the motion controller becomes a set value or more while monitoring the signal, and when the variable numbers are less than the set values, previous values are held as the identification values of J_hat, D_hat, and C_hat.

According to a fourteenth aspect of the present invention, in the system identifying method for a motion controller, the signals to be monitored are any one or more of the speed Vfb, the acceleration afb or the torque Tref, or Fvfb, Fafb or Ftref, or Dtref, Dvfb, Dafb, D2tref, D2vfb, D2afb.

According to a fifteenth aspect of the present invention, a motion controller comprises:

a command generator which generates a command;

a current controller which generates a current value for driving an electric motor based on the command and a detection value obtained from a detector attached to the electric motor;

an identifier which identifies an inertia identification value J_hat, a viscous friction coefficient identification value D_hat and a constant disturbance identification value C_hat of a control object;

an acceleration calculator which time-differentiates a speed detection value Vfb to calculate an acceleration detection value afb;

a first filter which filters the acceleration detection value afb to calculate a signal Fafb;

a second filter which filters the speed detection value Vfb to calculate a signal Fvfb;

a third filter which filters a torque command value Tref to calculate a signal Ftref; and a time-differentiator which time-differentiates the Ftref, Fvfb, Fafb to calculate Dtref, Dvfb, Dafb, respectively, and further time-differentiates Dtref, Dvfb and Dafb to calculate D2tref, D2vfb, D2afb;

wherein the inertia identification value J_hat and the viscous friction coefficient identification value D_hat are calculated by the following equations:

$$J\_hat = (D2tref \cdot Dvfb - Dtref \cdot D2vfb)/(Dvfb \cdot D2afb - D2vfb \cdot Dafb) \quad (a)$$

$$D\_hat = (D2afb \cdot Dtref - Dafb \cdot D2tref)/(Dvfb \cdot D2afb - D2vfb \cdot Dafb). \quad (b)$$

According to the first aspect of the present invention, since identification calculations are performed using deformed equations (using differentiations or divisions) without approximating the relation of torque command, viscous friction and constant disturbance and using signals obtained by filtering speed, acceleration and torque command values and performing time-differentiations and four arithmetic operations to perform identification calculations, without requiring an mechanical operation, even in cases where there are effects of constant disturbance such as viscous friction, Coulomb friction and/or gravity, the inertial identification value J_hat, the viscous friction coefficient identification value D_hat, and the constant disturbance identification value C_hat of a control object can be accurately identified. Furthermore, by performing filter processing, noise effects due to time-differentiation using the subsequent calculation can be decreased.

According to the second aspect of the present invention, since inertia can be identified only by three divisions and five time-differentiations, identification can be performed by simple calculations, thus requiring fewer calculations.

According to the third aspect of the present invention, since the friction constants can be identified only by single division and single multiplication, identification can be performed by simple calculations, thus requiring fewer calculations.

According to the fourth aspect of the present invention, since the constant disturbance can be identified only by two multiplications and one subtraction with three variables, identification can be performed by simple calculations, thus requiring fewer calculations.

According to the fifth aspect of the present invention, since a filter to be used in the filter processing has a denominator larger than a numerator by at least three of more orders, it becomes possible to perform three time-differentiations for identifying inertia.

According to the sixth and seventh aspects of the present invention, since identification calculations are not performed when the monitoring variable numbers are not larger than a set value, deterioration of calculations due to divisions using minute values can be prevented. Thus, identification accuracy can be kept high in any case.

According to the eighth and ninth aspects of the present invention, it is possible to provide a motion controller capable of accurately identifying an inertia identification value J_hat, a viscous friction coefficient identification value D_hat and a constant disturbance identification value C_hat of a control object without performing operations even in cases where there is constant disturbance such as viscous friction, Coulomb friction or gravity.

According to the tenth aspect of the present invention, assuming an equation obtained by deforming the relation between the torque command and the constant disturbance without approximating and time-differentiating both sides thereof and an equation obtained by further time-differentiating the both sides of the deformed equation as simultaneous equations to obtain a solution, identification calculation is performed only by time-differentiating and performing four arithmetic operations using signals obtained by subjecting a speed, an acceleration and a torque command value to filter processing. Therefore, without performing operations, it is possible to provide a motion controller capable of accurately identifying an inertia identification value J_hat, a viscous friction coefficient identification value D_hat and a constant disturbance identification value C_hat of a control object even in cases where there is constant disturbance such as viscous friction, Coulomb friction or gravity. Furthermore, by performing filter processing, noise effects due to time-differentiation using the subsequent calculation can be decreased.

According to the eleventh aspect of the present invention, since a filter to be used in the filter processing has a denominator larger than a numerator by at least three of more orders, it becomes possible to perform three time-differentiations for identifying inertia.

According to the twelfth aspect of the present invention, by using a moving average as a filter, it becomes possible to eliminate the difference of the phase retardation of each variable, which makes it possible to perform identification more accurately.

According to the thirteenth and fourteenth aspects of the present invention, since identification calculations are not performed when the variable numbers to be monitored are not larger than the set value, deterioration of calculations due to divisions using minute values can be prevented. Thus, identification accuracy can be kept high in any case.

DETAILED DESCRIPTION OF THE INVENTION

Hereinafter, concrete embodiments of the present invention will be detailed with reference to drawings.

Embodiment 1

Figure 1:
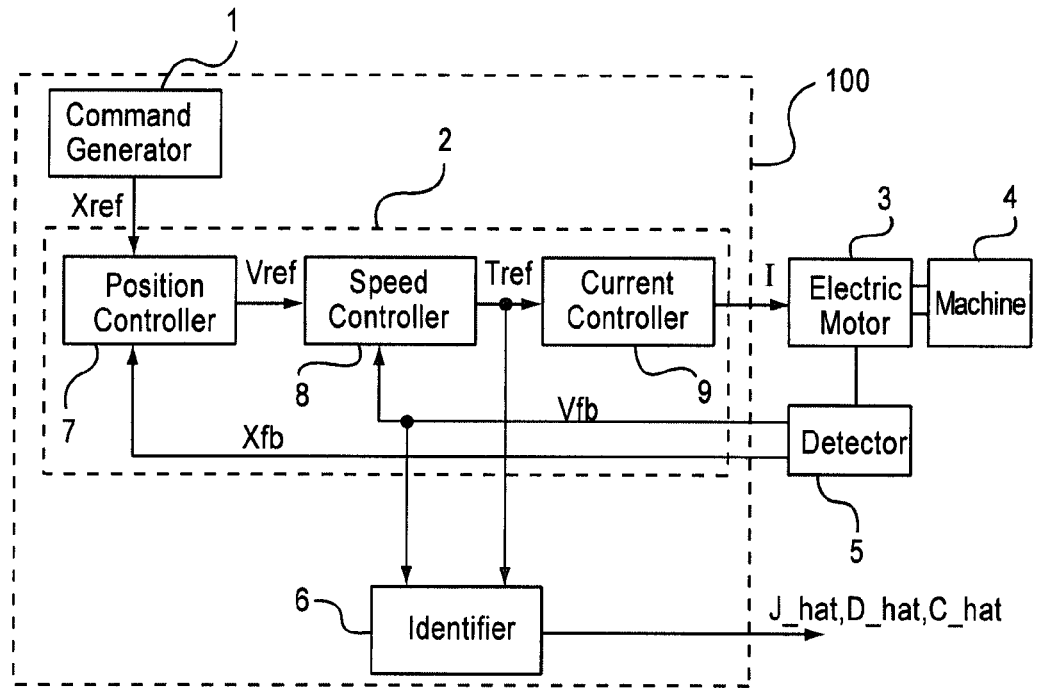
FIG. 1 is a block diagram showing a structure of a motion controller to which a method according to the present invention is applied.

FIG. 1 is a block diagram showing a structure of a motion controller 100 for carrying out a method according to the present invention. In this figure, the reference numeral "1" denotes a command generator for generating a position command Xref. "2" denotes a controller which performs control calculations based on a position command, a position detection value Xfb and a speed detection value Vfb to output current I. Although calculations to be performed in the controller 2 are not limited, in this embodiment, the controller 2 includes a position controller 7 which outputs a speed command Vref based on the position command Xref and the position detection value Xfb, a speed controller 8 which outputs a torque command value Tref based on the speed command Vref and the speed detection value Vfb, and a current controller 9 which controls so that current flows as specified by the torque command value. The aforementioned speed detection value Vfb can be a value obtained by time-differentiating the position detection value Xfb. Alternatively, in the case of digital control, the aforementioned speed detection value Vfb can be an approximate differentiation value obtained by dividing the difference in position detection values Xfb by the control cycle. The reference numeral "3" denotes an electric motor to which a machine 4 is connected.

"5" denotes a detector for detecting the position and speed of the motor 3. "6" denotes an identifier which calculates the inertia identification value J_hat, the viscous friction coefficient identification value D_hat, and the constant disturbance identification value C_hat of a control object based on the torque command Tref and the speed detection value Vfb.

Figure 3:
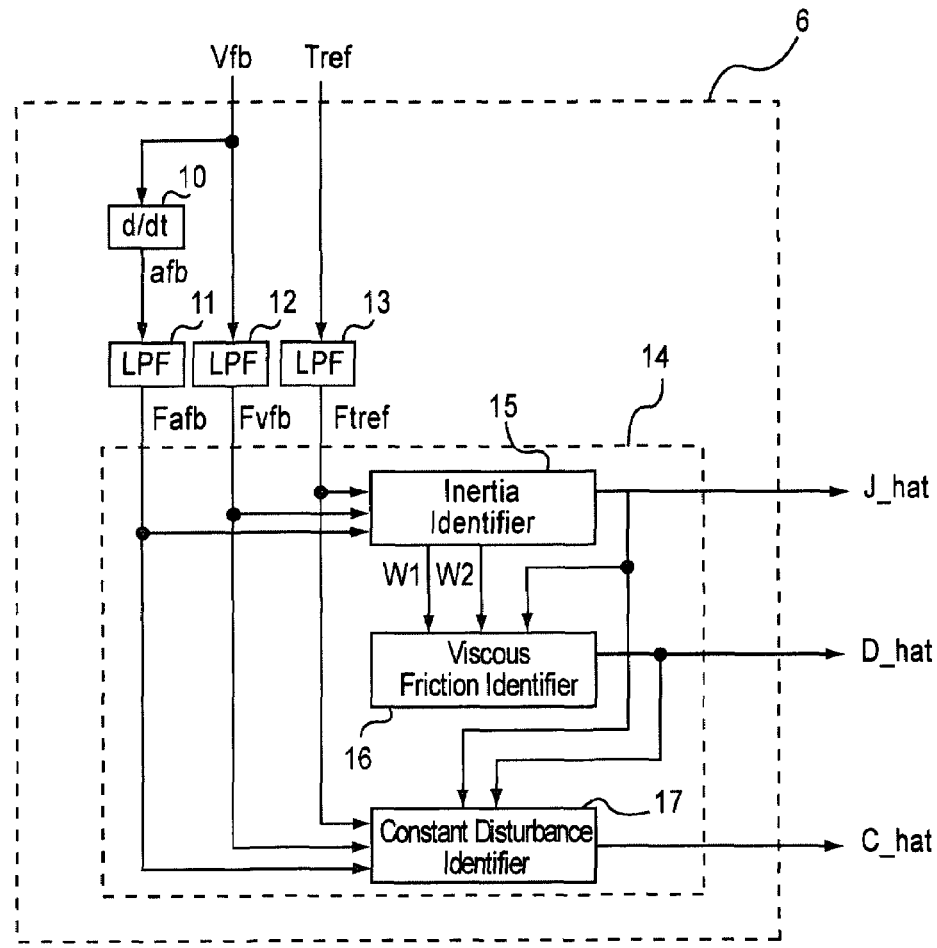
FIG. 3 is a block diagram showing a structure of an identifier of a motion controller to which a first method according to the present invention is applied.

FIG. 3 is a block diagram showing the processing of the identifier. In this figure, "10" denotes a time differentiator for calculating an acceleration detection value afb by time-differentiating the speed detection value Vfb. Here, at the time of digital control, as a time differentiation calculation, approximate differentiation in which the difference between the signal of the present time and the signal of the previous time is divided by the control cycle can be used.

"11," "12," "13" denote the same filter. The filter to be used here has a denominator larger than a numerator by at least three or more orders. For example, the transfer characteristic of the filter can be represented by the transfer function Gfil as shown in the following equation (1).

$$Gfil = r^3/(s+r)^3 \quad (1)$$

where "s" is a Laplace operator.

The filer to be used can be any filter. Even if three or more primary filters are connected in series, no problem arises.

The reference numeral "14" denotes a JDC (inertia, viscous friction, constant disturbance) estimator which inputs Ftref, Fvfb, Fafb (obtained by filtering the torque command Tref, the speed detection value Vfb and the acceleration detection value afb) and calculates the inertia identification value J_hat, the viscous friction coefficient identification value D_hat and the constant disturbance identification value C_hat of a control object. Furthermore, the JDC estimator 14 is comprised of three identifiers, i.e., an inertia identifier 15, a viscous friction identifier 16 and a constant disturbance identifier 17.

Hereinafter, the processing of the inertia identifier 15, the viscous friction identifier 16 and the constant disturbance identifier 17 will be detailed.

(I) Processing in Inertia Identifier

Figure 4:
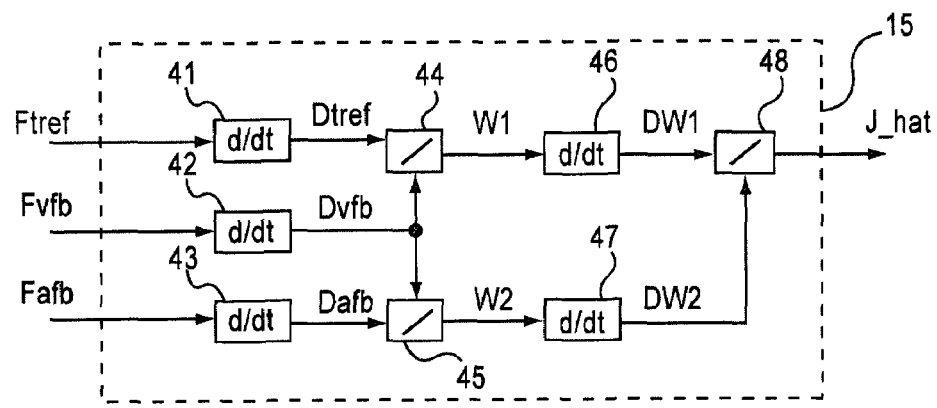
FIG. 4 is a block diagram showing a structure of an inertia identifier.

FIG. 4 is a block diagram showing the processing of the inertia identifier 15. In this figure, "41," "42," "43," "46," and "47" denote a time differentiator, respectively, and "44," "45" and "48" denote a divider, respectively. The inertia identification value J_hat is calculated by the following steps.

Initially, Ftref, Fvfb and Fafb are time-differentiated to obtain Dtref, Dvfb and Dafb. Next, Dtref is divided by the Dvfb to calculate W1. Thereafter, Dafb is divided by the Dvfb to calculate W2, then W1 is time-differentiated to calculate DW1, then W2 is time-differentiated to calculate DW2, then DW1 is divided by the DW2 to obtain the inertia identification value J_hat.

This processing can be expressed by the following equations (2) to (9).

$$Dtref = dFtref/dt \quad (2)$$

$$Dvfb = dFvfb/dt \quad (3)$$

$$Dafb = dFafb/dt \quad (4)$$

$$W1 = Dtref/Dvfb \quad (5)$$

$$W2 = Dafb/Dvfb \quad (6)$$

$$DW1 = dW1/dt \quad (7)$$

$$DW2 = dW2/dt \quad (8)$$

$$J\_hat = DW1/DW2 \quad (9)$$

Here, at the time of digital control, as a time differentiation calculation, approximate differentiation in which the difference between the signal of the present time and the signal of the previous time is divided by the control cycle can be used.

(II) Processing of the Viscous Friction Identifier

Figure 5:
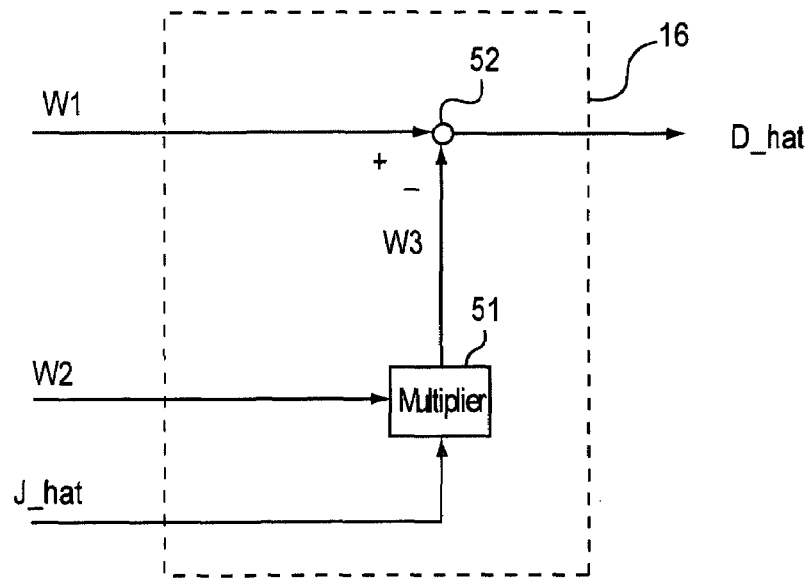
FIG. 5 is a block diagram showing a structure of a viscous friction identifying portion.

FIG. 5 is a block diagram showing the processing of the viscous friction identifier 16. In this figure, the reference numeral "51" denotes a multiplier and "52" denotes a subtractor. The viscous friction coefficient identification value D_hat is calculated by the following steps.

Initially, W2 and the inertia identification value J_hat are multiplied to calculate W3. Next, W3 is subtracted from W1 to define the identification value D_hat. This processing is represented by the following equations (10) and (11).

$$W3 = W2 \cdot J\_hat \tag{10}$$

$$D\_hat = W1 - W3 \tag{11}$$

(III) Processing of Constant Disturbance Identifier

Figure 6:
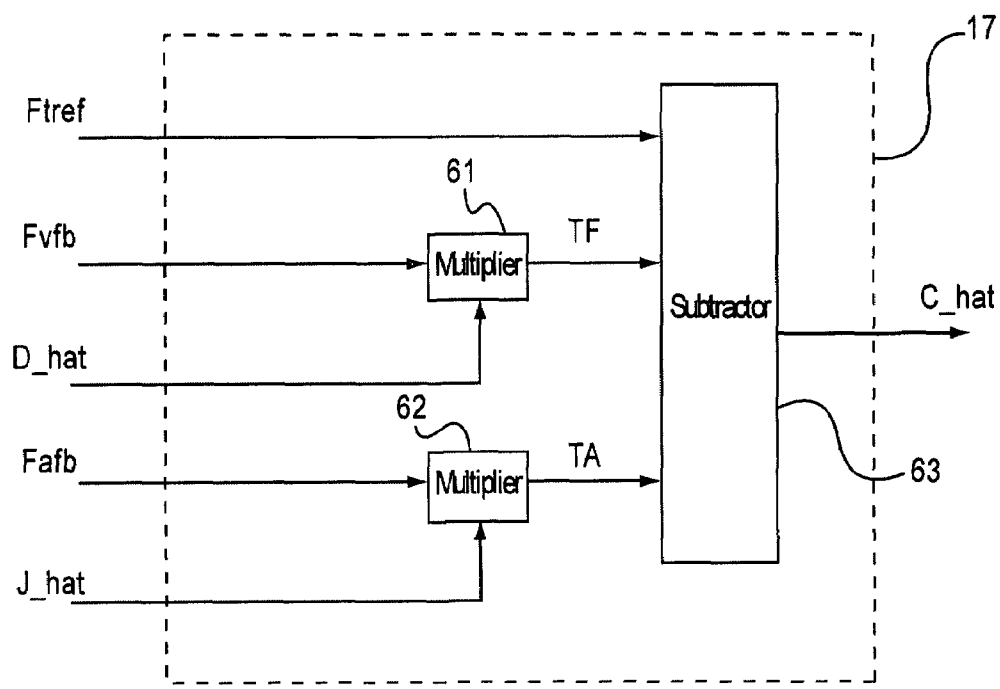
FIG. 6 is a block diagram showing a structure of a constant disturbance identifying portion.

FIG. 6 is a block diagram showing the processing of the constant disturbance identifier 17. In this figure, the reference numerals "61" and "62" denote a multiplier respectively, and "63" denotes a subtractor which subtracts 2 variables from 1 variable. The constant disturbance identification value D_hat is calculated by the following steps.

Initially, the Fvfb and the viscous friction coefficient identification value D_hat are multiplied to calculate TF. Next, Fafb and the inertia identification value J_hat are multiplied to calculate TA. Then, TF and TA are subtracted from Ftref to define the constant disturbance identification value C_hat.

This processing is represented by the following equations (12) to (14).

$$TF = Fvfb \cdot D\_hat \tag{12}$$

$$TA = Fafb \cdot J\_hat \tag{13}$$

$$C\_hat = Ftref - TF - TA \tag{14}$$

As explained above, by performing the aforementioned processing in the identifier 6, the inertial identification value J_hat, the viscous friction coefficient identification value D_hat and the constant disturbance identification value C_hat of a control object can be identified.

Furthermore, in place of constantly performing the aforementioned processing, the aforementioned processing can be performed only when one of the speed Vfb, the acceleration afb and the torque command value Tref or the combination thereof exceed a previously set threshold value while monitoring them. This improves the identification accuracy.

The variable numbers to be monitored can be one or any combination of Fvfb, Fafb and Ftref (obtained by filtering Vfb, afb and Ttref), respectively.

Furthermore, when the monitoring variable numbers are smaller than the predetermined threshold, it can be configured such that the aforementioned calculations are not performed and the last calculated numbers are held as identification numbers. With this, each identification number can be updated only when the calculation is being performed.

When the monitoring variable numbers are smaller than the predetermined threshold, it also can be configured such that not all of the calculations of the inertia identification value J_hat, the viscous friction coefficient identification value D_hat and the constant disturbance identification value C_hat of a control object are performed, but only some of them are performed.

In the present invention, in place of the torque command Tref, a current command can be used. In this case, the unit of the current is converted into the unit of the torque using the torque constant (thrust force).

In this embodiment, although a rotary machine is exemplified, in the case of a machine performing translational movements, not the inertia J but the mass M can be estimated by the same calculations.

Figure 2:
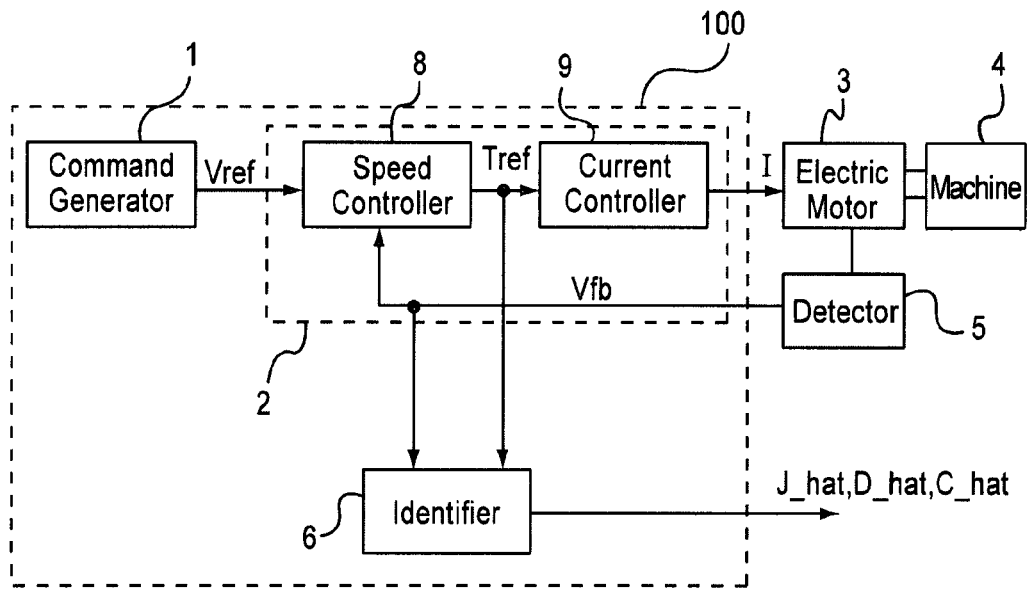
FIG. 2 is a block diagram showing a structure of a second motion controller to which a method according to the present invention is applied.

In this embodiment 1, a position control is performed. In the case of performing speed control, as shown in FIG. 2, by the same method, the inertia identification value J_hat, the viscous friction coefficient identification value D_hat and the constant disturbance identification value C_hat of a control object can be identified. In this case, the command generator 1 generates a speed command Vref and the controller 2 performs only the calculations of the speed controller and the current controller.

The method for deriving the equations in the first embodiment will be explained below.

In the case where viscous friction (friction coefficient D) and constant disturbance C act on a machine having inertia J, the relation between the given torque command Tref and the speed Vfb is represented by the equation (15).

$$Tref = J \cdot afb + D \cdot Vfb + C \tag{15}$$

By subjecting both sides to filter processing, the following equation (16) can be obtained.

$$Ftref = J \cdot Fafb + D \cdot Fvfb + C \tag{16}$$

By subjecting both sides to time-differentiation, the constant value C can be eliminated to obtain the following equation (17).

$$Dtref = J \cdot Dafb + D \cdot Dvfb \tag{17}$$

By dividing both sides by Dvfb, the following equation (18) can be obtained.

$$Dtref/Dvfb = J \cdot Dafb/Dvfb + D \tag{18}$$

By rewriting the above equation with W1(=Dtref/Dvfb), W2(=Dafb/Dvfb), the following equation (19) can be obtained.

$$W1 = J \cdot W2 + D \tag{19}$$

By subjecting both sides to time-differentiation, the constant value D can be eliminated to obtain the following equation (20).

$$DW1 = J \cdot DW2 \tag{20}$$

Accordingly, J can be calculated by the following equation (21).

$$J = DW1/DW2 \tag{21}$$

From the equations (19) and (21), D can be calculated by the following equation (22).

$$D = W1 - J \cdot W2 \tag{22}$$

From the equation (16), C can be calculated by the following equation (23).

$$C = Ftref - J \cdot Fafb - D \cdot Fvfb \tag{23}$$

As explained above, equations capable of identifying each value can be obtained without using approximation at all.

Example 2

Next, a second method according to the present invention will be explained.

FIG. 1 is a block diagram showing a structure of a motion controller for executing the method of the present invention. This figure was explained in Example 1 and therefore the explanation will be omitted.

Figure 7:
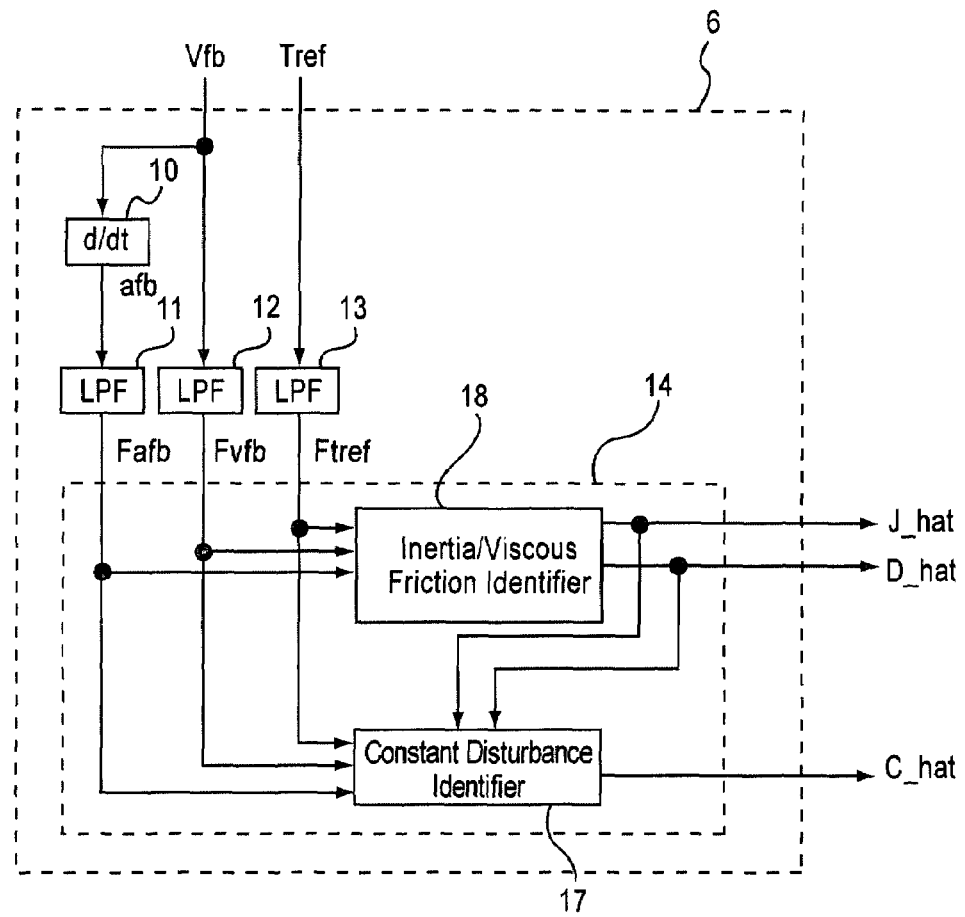
FIG. 7 is a block diagram showing a structure of an identifier of a motion controller to which a second method according to the present invention is applied.

FIG. 7 shows a block diagram showing the processing in the identifier 6. Since this is different from the block diagram shown in FIG. 1, the explanation will be made as follows. In this figure, the reference numeral "10" denotes a time-differentiator which time-differentiates the speed detection value Vfb to calculate the speed acceleration detection value afb. Here, in the case of digital control, as a time-differentiation calculation, approximate differentiation in which the difference between the signal of the present time and the signal of the previous time is divided by the control cycle can be used. The reference numerals "11," "12," and "13" denote the first filter, the second filter, and the third filter, respectively. The filter to be used here has preferably a denominator larger than a numerator by at least three of more orders. For example, the transfer characteristic of the filter can be represented by the transfer function Gfil as shown in the following equation (24).

$$Gfil = r^3/(s+r)^3 \tag{24}$$

where "s" is a Laplace operator.

The filter to be used can be any filter. Even if three or more primary filters are connected in series, no problem arises. Furthermore, even if three or more moving average filters are connected in series, no problem arises. In this case, the filter processing causes no phase retardation, which can further improve the estimation accuracy.

The reference numeral "14" denotes a JDC estimator which inputs Ftref, Fvfb, Fafb (obtained by filtering the torque command Tref, the speed detection value Vfb, and the acceleration detection value afb) to calculate the inertia identification value J_hat, the viscous friction coefficient identification value D_hat and the constant disturbance identification value C_hat of a control object. Furthermore, the JDC estimator 14 is comprised of two identifiers, i.e., an inertia/viscous friction identifier 18 and a constant disturbance identifier 17.

Hereinafter, the processing of the inertia/viscous friction identifier 18 and the constant disturbance identifier 17 will be detailed.

(IV) Processing in the Inertia/Viscous Friction Identifier

Figure 8:
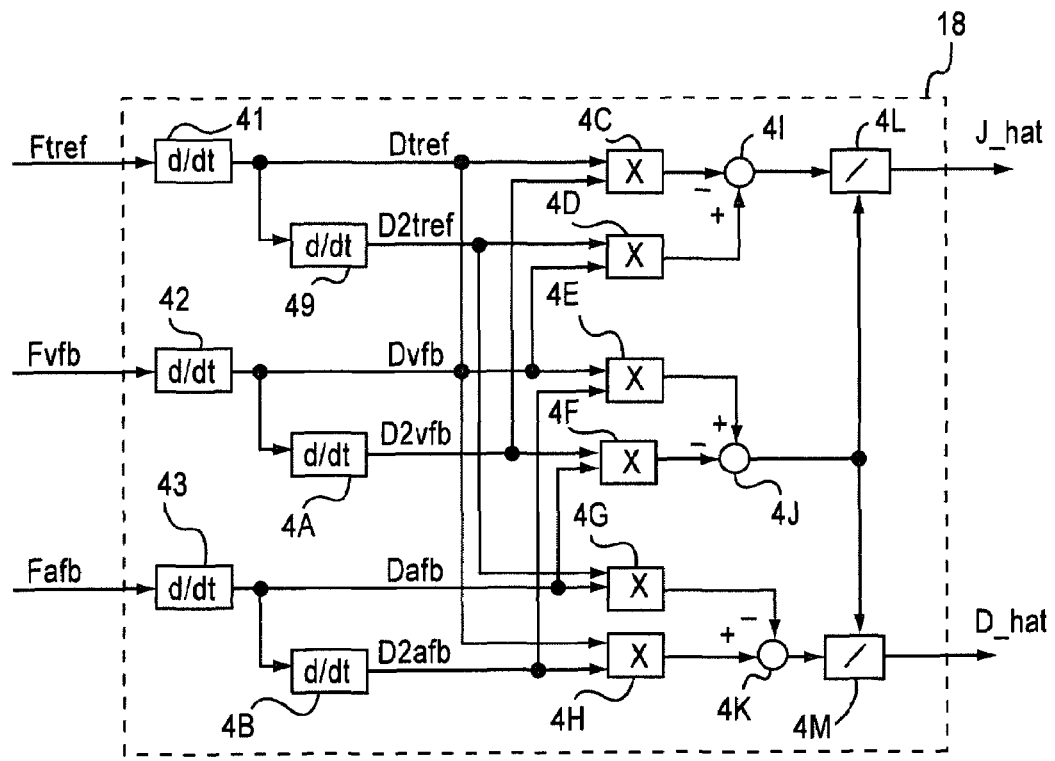
FIG. 8 is a block diagram showing a structure of an inertia/viscous friction identifying portion.
Figure 9:
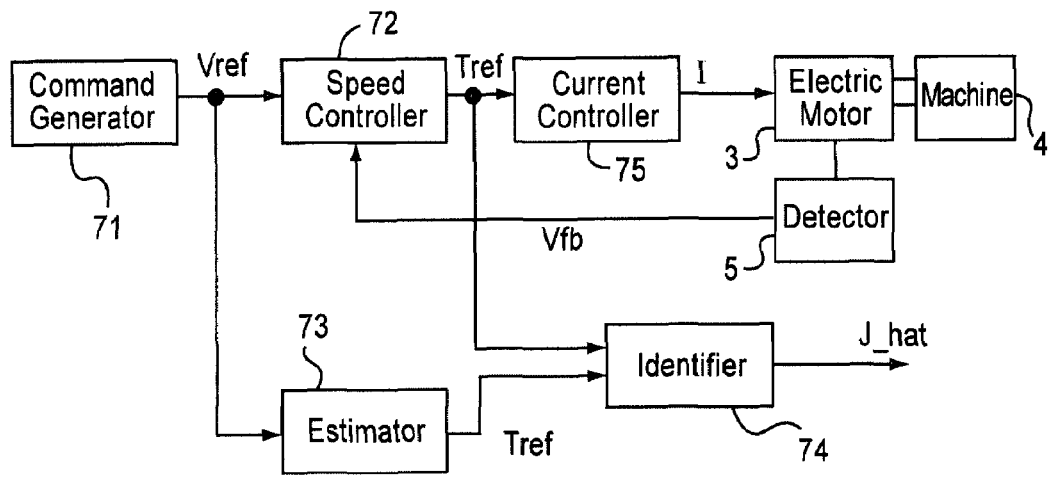
FIG. 9 is a block diagram showing a structure of a motion controller to which a conventional method is applied.
Figure 10:
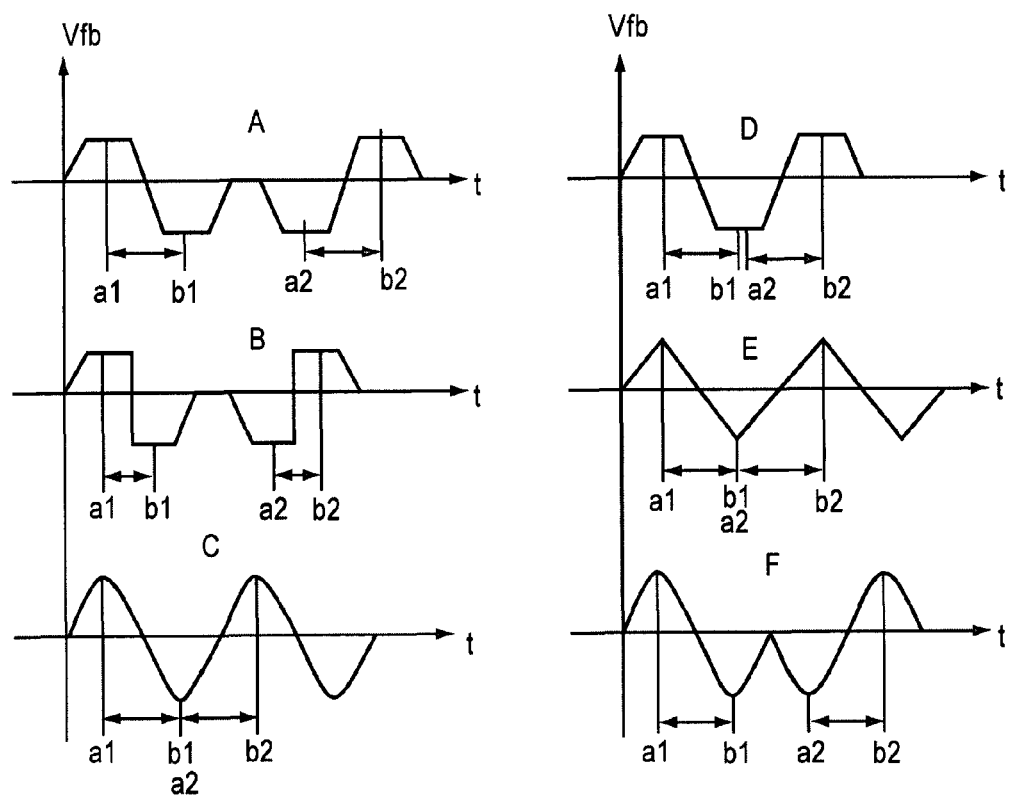
FIG. 10 shows operations limited by a conventional method.

FIG. 8 denotes a block diagram showing the processing of the inertia/viscous friction identifier 18. In this figure, the reference numeral "41," "42," "43," "49," "4A," "4B" each denote a time-differentiator. "4C," "4D," "4E," "4F," "4G," and "4H" each denote a multiplier. "4I," "4J," and "4k" each denote a subtractor. "4L" and "4M" each denotes a divider. The inertia identification value J_hat and the viscous friction coefficient identification value D_hat can be calculated by the following steps.

Initially, Ftref, Fvfb and Fafb are time-differentiated respectively to calculate Dtref, Dvfb and Dafb. Next, the time-differentiation is performed again to calculate D2tref, D2vfb and D2afb. Here, in the case of digital control, as a time differentiation calculation, approximate differentiation in which the difference between the signal of this time and the signal of the previous time is divided by the control cycle can be used.

Then, using these variables, the calculations of the equations (25) and (26) are performed to estimate the inertia identification value J_hat and the viscous friction coefficient identification value D_hat.

$$J\_hat = (D2tref \cdot Dvfb - Dtref \cdot D2vfb)/(Dvfb \cdot D2afb - D2vfb \cdot Dafb) \tag{25}$$

$$D\_hat = (D2afb \cdot Dtref - Dafb \cdot D2tref)/(Dvfb \cdot D2afb - D2vfb \cdot Dafb) \tag{26}$$

FIG. 6 is a block diagram showing the processing of the constant disturbance identifier 17. The explanation of the processing in the constant disturbance identifier 17 was made in Example 1 and therefore the explanation will be omitted.

Furthermore, in place of constantly performing the aforementioned processing, the aforementioned processing can be performed only when one of the speed Vfb, the acceleration afb, the torque command value Tref and the combination thereof exceeds a previously set threshold value while monitoring them. This improves the identification accuracy.

The variable numbers to be monitored can be one or any combination of the speed Vfb, the acceleration afb, the torque Tref, or Fvfb, Fafb and Ftref (obtained by filtering Vfb, afb and Ttref respectively), or Dtref, Dvfb, Dafb, D2tref, D2vfb, D2afb obtained by time-differentiating those signals.

Furthermore, when the monitoring variable numbers are smaller than the predetermined threshold, it can be configured such that the aforementioned calculations are not performed and each last calculated number is updated only when the calculation is being performed by holding the last calculation value as the identification number.

When the monitoring variable numbers are smaller than the predetermined threshold, it also can be configured such that not all of the calculations of the inertia identification value J_hat, the viscous friction coefficient identification value D_hat and the constant disturbance identification value C_hat of a control object are performed but only some of them are performed.

In the present invention, in place of the torque command, a current command can be used. In this case, the unit of the current is converted into the unit of the torque using the torque constant (thrust force).

Here, although a rotary machine is exemplified, in the case of a machine performing translational movements, not the inertia J but the mass M can be estimated by the same calculations.

In this embodiment 2, a position control is performed. In the case of speed control, as shown in FIG. 2, by the same method, the inertia identification value J_hat, the viscous friction coefficient identification value D_hat and the constant disturbance identification value C_hat of a control object can be identified. In this case, the command generator 1 generates a speed command Vref and the controller 2 performs only the calculations of the speed controller and the current controller.

The method for deriving the equations in the embodiment 2 will be explained below.

In the case where viscous friction (friction coefficient D) and constant disturbance C act on a machine having inertia J, the relation between the given torque command Tref and the speed Vfb is represented by the equation (27).

$$Tref = J \cdot afb + D \cdot Vfb + C \tag{27}$$

By subjecting both sides to filter processing, the following equation (28) can be obtained.

$$Ftref = J \cdot Fafb + D \cdot Fvfb + C \tag{28}$$

By subjecting both sides to time-differentiation, the constant value C can be eliminated to obtain the following equation (29).

$$Dtref = J \cdot Dafb + D \cdot Dvfb \quad (29)$$

By subjecting both sides to time-differentiation, the following equation (30) can be obtained.

$$D2tref = J \cdot D2afb + D \cdot D2vfb \quad (30)$$

Assuming the above equations (29) and (30) as simultaneous equations, by calculating the estimate values of J and D, the following equations (31) and (32) can be obtained.

$$J = (D2tref \cdot Dvfb - Dtref \cdot D2vfb)/(Dvfb \cdot D2afb - D2vfb \cdot Dafb) \quad (31)$$

$$D = (D2afb \cdot Dtref - Dafb \cdot D2tref)/(Dvfb \cdot D2afb - D2vfb \cdot Dafb) \quad (32)$$

From the equations (28), C can be calculated by the equation (33).

$$C = Ftref - J \cdot Fafb - D \cdot Fvfb \quad (33)$$

As explained above, equations capable of identifying each value can be obtained without using approximation at all.

Inertia identification value J_hat, viscous friction coefficient identification value D_hat and constant disturbance identification value C_hat of a control object can be accurately identified by using filtered variables and then performing only time-differentiation and four arithmetic operations. This can be applied to a system identification for industrial robots or machine tools.

I claim:

1. A system identifying method for a motion controller comprising:
   time-differentiating a speed detection value Vfb to calculate an acceleration detection value afb;
   filtering the acceleration detection value afb to calculate a signal Fafb;
   filtering the speed detection value Vfb to calculate a signal Fvfb;
   filtering a torque command value Tref to calculate a signal Ftref and performing time-differentiation and four arithmetic operations based on Ftref, Fvfb and Fafb to calculate an inertia identification value J_hat, a viscous friction coefficient identification value D_hat and a constant disturbance identification value C_hat of the control object,
   wherein the motion controller comprises a command generator,
   a controller which outputs a current value for driving an electric motor based on a command outputted from the command generator and a detection value obtained from a detector attached to the electric motor, and
   an identifier which identifies inertia identification value J_hat, viscous friction coefficient identification value D_hat and constant disturbance identification value C_hat of a control object.

2. The system identifying method for a motion controller as recited in claim 1, wherein the calculation for calculating inertia identification value J_hat comprises:
   time-differentiating Ftref, Fvfb and Fafb to calculate Dtref, Dvfb and Dafb, respectively,
   dividing Dtref by Dvfb to calculate W1;
   dividing Dafb by Dvfb to calculate W2;
   time-differentiating W1 to calculate DW1;
   time-differentiating W2 to calculate DW2; and
   dividing DW1 by DW2 to obtain the inertia identification value J_hat.

3. The system identifying method for a motion controller as recited in claim 2, wherein the calculation for calculating viscous friction coefficient identification value D_hat comprises:
   after calculating inertia identification value J_hat, multiplying W2 and inertia identification value J_hat to calculate W3; and
   subtracting W3 from W1 to obtain viscous friction coefficient identification value D_hat.

4. The system identifying method for a motion controller as recited in claim 1, wherein the calculation for calculating constant disturbance identification value C_hat comprises:
   after calculating inertial identification value J_hat and viscous friction coefficient identification value D_hat, multiplying Fvfb and viscous friction coefficient identification value D_hat to calculate TF;
   multiplying Fafb and inertia identification value J_hat to calculate TA; and
   subtracting TF and TA from Ftref to obtain constant disturbance identification value C_hat.

5. The system identifying method for a motion controller as recited in claim 4, wherein calculation for calculating inertial identification value J_hat, viscous friction coefficient identification value D_hat and constant disturbance identification value C_hat of the control object is performed only when variable numbers become a set value or more while monitoring the variable numbers, and wherein when the variable numbers are less than the set values, previous values are held as identification values of J_hat, D_hat and C_hat.

6. The system identifying method for a motion controller as recited in claim 5, wherein the variable numbers to be monitored are any one or a combination of the speed Vfb, the acceleration afb, torque Tref, or Fvfb, Fafb or Ftref, or Dvfb, DW2.

7. The system identifying method for a motion controller as recited in claim 1, wherein a filter to be used in the filter processing has a denominator larger than a numerator by at least three of more orders.

8. A motion controller comprising:
   a command generator;
   a current controller which controls an electric motor based on a command outputted from the command generator and a detection value obtained from a detector attached to the electric motor and outputs a current value for driving the electric motor;
   an identifier which identifies an inertia identification value J_hat, a viscous friction coefficient identification value D_hat and a constant disturbance identification value C_hat of a control object,
   a time-differentiator which time-differentiates a speed detection value Vfb to calculate an acceleration detection value afb;
   a first filter which filters the acceleration detection value afb to calculate Fafb;
   a second filter which filters the speed detection value Vfb to calculate Fvfb;
   a third filter which filters a torque command value Tref to calculate Ftref; and
   an estimator which performs time-differentiation and four arithmetic operations based on Ftref, Fvfb and Fafb to calculate the inertia identification value J_hat, the viscous friction coefficient identification value D_hat and the constant disturbance identification value C_hat of the control object.

9. The motion controller as recited in claim 8, wherein the estimator comprises:
- an inertia estimator which estimates inertia;
- a viscous friction estimator which estimates viscous friction; and
- a constant disturbance estimator which estimates constant disturbance.

10. A system identifying method for a motion controller comprising:
- time-differentiating a speed detection value Vfb to calculate an acceleration detection value afb;
- filtering the acceleration detection value afb to calculate a signal Fafb;
- filtering the speed detection value Vfb to calculate a signal Fvfb;
- filtering a torque command value Tref to calculate a signal Ftref; and
- time-differentiating Ftref, Fvfb, Fafb to calculate Dtref, Dvfb, DaTh, respectively, and further time-differentiating Dtref, Dvfo and Dafb to calculate D2tref, D2vfb, D2afb; and
- calculating an inertia identification value J_hat and a viscous friction coefficient identification value D_hat by the following equations: J_hat=(D2trefDvfb−DtrefD2vfb)/(DvfbD2afb−D2vfbDafb) (a) D_hat=(D2afbDtref−DafbD2tref/(DvfbD2afb−D2vfbDafb), (b)
- wherein the motion controller comprises a command generator which generates a command,
- a current controller which generates a current value for driving an electric motor based on the command and a detection value obtained from a detector attached to the electric motor, and
- an identifier which identifies inertia identification value J_hat, viscous friction coefficient identification value D_hat and constant disturbance identification value C_hat of a control object.

11. The system identifying method for a motion controller as recited in claim 10, —wherein a filter to be used in the filter processing has a denominator larger than a numerator by at least three of more orders.

12. The system identifying method for a motion controller as recited in claim 10, wherein a filter to be used in the filter processing comprises a plurality of moving average filters connected in series.

13. The system identifying method for a motion controller as recited in claim 10, wherein the calculation for calculating the inertial identification value J_hat the viscous friction coefficient identification value D_hat and the constant disturbance identification value C_hat of the control object is performed only when variable numbers of the motion controller becomes a set value or more while monitoring the signal, and wherein when the variable numbers are less than the set values, previous values are held as the identification values of J_hat, D_hat, and C_hat.

14. The system identifying method for a motion controller as recited in claim 13, wherein the signals to be monitored are any one or more of the speed Vfb, the acceleration afb or the torque Tref, or Fvfb, Fafb or Ftref, or Dtref, Dvfb, Dafb, D2tref, D2vfb, D2afb.

15. A motion controller comprising:
- a command generator which generates a command;
- a current controller which generates a current value for driving an electric motor based on the command and a detection value obtained from a detector attached to the electric motor;
- an identifier which identifies an inertia identification value J_hat, a viscous friction coefficient identification value D_hat and a constant disturbance identification value C_hat of a control object;
- an acceleration calculator which time-differentiates a speed detection value Vfb to calculate an acceleration detection value afb;
- a first filter which filters the acceleration detection value afb to calculate a signal Fafb;
- a second filter which filters the speed detection value Vfb to calculate a signal Fvfb;
- a third filter which filters a torque command value Tref to calculate a signal Ftref; and
- a time-differentiator which time-differentiates the Ftref, Fvfb, Fafb to calculate Dtref, Dvfb, Dafb, respectively, and further time-differentiates Dtref, Dvfb and Dafb to calculate D2tref, D2vfb, D2afb;
- wherein the inertia identification value J_hat and the viscous friction coefficient identification value D_hat are calculated by the following equations:

$$J\_hat = (D2tref Dvfb - Dtref D2vfb)/(Dvfb D2afb - D2vtb Dafb) \quad (a)$$

$$D\_hat = (D2afb Dtref - Dafb D2tref)/(Dvfb D2afb - D2vfb Dafb) \quad (b).$$

* * * * *